US008495085B2

(12) United States Patent
Cai et al.

(10) Patent No.: US 8,495,085 B2
(45) Date of Patent: Jul. 23, 2013

(54) SUPPORTING EFFICIENT PARTIAL UPDATE OF HIERARCHICALLY STRUCTURED DOCUMENTS BASED ON RECORD STORAGE

(75) Inventors: Mengchu Cai, San Jose, CA (US); Yu Chen, San Jose, CA (US); Eric Naoto Katayama, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/891,146

(22) Filed: Sep. 27, 2010

(65) Prior Publication Data

US 2012/0078942 A1 Mar. 29, 2012

(51) Int. Cl.
*G06F 17/30* (2006.01)

(52) U.S. Cl.
CPC ................................ *G06F 17/30424* (2013.01)
USPC .......................................... 707/769; 707/770

(58) Field of Classification Search
USPC .................. 707/651, 769, 778, 786, 829, 956
See application file for complete search history.

(56) References Cited

U.S. PATENT DOCUMENTS

| | | | | |
|---|---|---|---|---|
| 5,764,978 | A * | 6/1998 | Masumoto | 1/1 |
| 5,943,683 | A | 8/1999 | Yamaguchi | |
| 6,959,311 | B2 | 10/2005 | Schofield | |
| 7,103,611 | B2 * | 9/2006 | Murthy et al. | 1/1 |
| 7,318,063 | B2 * | 1/2008 | Brychell et al. | 715/234 |
| 7,437,664 | B2 * | 10/2008 | Borson | 715/234 |
| 7,484,171 | B2 * | 1/2009 | Jeon et al. | 715/229 |
| 7,516,145 | B2 | 4/2009 | Sikchi et al. | |
| 7,516,399 | B2 * | 4/2009 | Hsu et al. | 715/234 |
| 7,640,278 | B2 | 12/2009 | Lashley et al. | |
| 2004/0010752 | A1 * | 1/2004 | Chan et al. | 715/513 |
| 2004/0060006 | A1 * | 3/2004 | Lindblad et al. | 715/513 |
| 2004/0068498 | A1 * | 4/2004 | Patchet et al. | 707/6 |
| 2006/0004858 | A1 | 1/2006 | Tran et al. | |
| 2007/0043743 | A1 | 2/2007 | Chen et al. | |
| 2007/0043751 | A1 | 2/2007 | Chen et al. | |

OTHER PUBLICATIONS

Carino, Felipe; Burgess, John; "StoreHouse/Relational Manager (RM)—Active Storage Hierarchy Database System and Applications"; Google; 1999-2000.
Cohen, Edward I.; King, Gary M.; Brady, James T.; "Storage Hierarchies"; IBM Systems Journal, vol. 28, No. 1, 1989.

* cited by examiner

*Primary Examiner* — John E Breene
*Assistant Examiner* — Evan Aspinwall
(74) *Attorney, Agent, or Firm* — Mollborn Patents, Inc.; Fredrik Mollborn

(57) ABSTRACT

Methods and apparatus, including computer program products, implementing and using techniques for performing a partial update of a hierarchically structured document referencing one or more records stored in a database. An expression specifying one or more updates to be applied to the document is received. The document is searched to find update target position(s). Based on the received expression, a pending update list is built. When an update target position is found, a row of a document column in a base table is updated with the new version number for the document. New database records for insertion into the new document version are generated from the pending update list. Old database records to be replaced are identified. A database table for the document is updated to mark the old database records as obsolete and to add new database records to be referenced in the new version of the document.

19 Claims, 7 Drawing Sheets

Tgt Update target node

Par Parent node

P Proxy node

SUPPORTING EFFICIENT PARTIAL UPDATE OF HIERARCHICALLY STRUCTURED DOCUMENTS BASED ON RECORD STORAGE

BACKGROUND

The present invention relates to updating electronic documents, and more specifically, to updating hierarchically structured electronic documents stored in databases. There are numerous types of electronic documents that are used in various computer applications. Often these documents have a hierarchical structure. One example of a hierarchically structured document is an Extensible Markup Language (XML) document.

As hierarchically structured data, such as XML documents become widely used as a data format, it also becomes a native data type for database systems. One example of a database system is the DB2 Enterprise Server Edition, which is a relational model database server developed by International Business Machines Corporation of Armonk, N.Y. The storage of hierarchically structured data in relational databases such as the DB2, however, poses various challenges.

One such challenge relates to updating an XML document. The updates may involve operations, such as deleting nodes and sub-trees, thus reducing the data. The updates may involve inserting nodes and sub-trees, thus expanding the data, and possibly growing the data into multiple records. The updates may involve replacing nodes, which may result in either expanding or reducing data, depending on the nature of the data to be updated. In addition, XML indexes need to be maintained for all updates.

SUMMARY

According to one embodiment of the present invention, methods and apparatus, including computer program products are described for performing a partial update of a hierarchically structured document referencing one or more records stored in a database. An expression that specifies one or more updates to be applied to the document is received. The document is searched to find one or more update target positions. Based on the received expression, a pending update list is built that contains requested updates which have not yet been applied to the document. In response to finding an update target position in the document, a row of a document column in a base table of the database is updated with the new version number for the document. New database records are generated based on the pending update list, which are to be inserted into the new version of the document. Old database records to be replaced in the new version of the document are identified. A database table for the document is updated to mark the old database records as obsolete and to add new database records to be referenced in the new version of the document.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

The various embodiments described herein describe novel methods and apparatus, including computer program products, for implementing partial updates of hierarchical documents stored as records in relational databases. The partial updates will be described herein by way of example and with reference to XML documents, but as the skilled person realizes, the techniques described herein can be applied to essentially any hierarchically structured document that is stored as records in a relational database.

Figure 1:
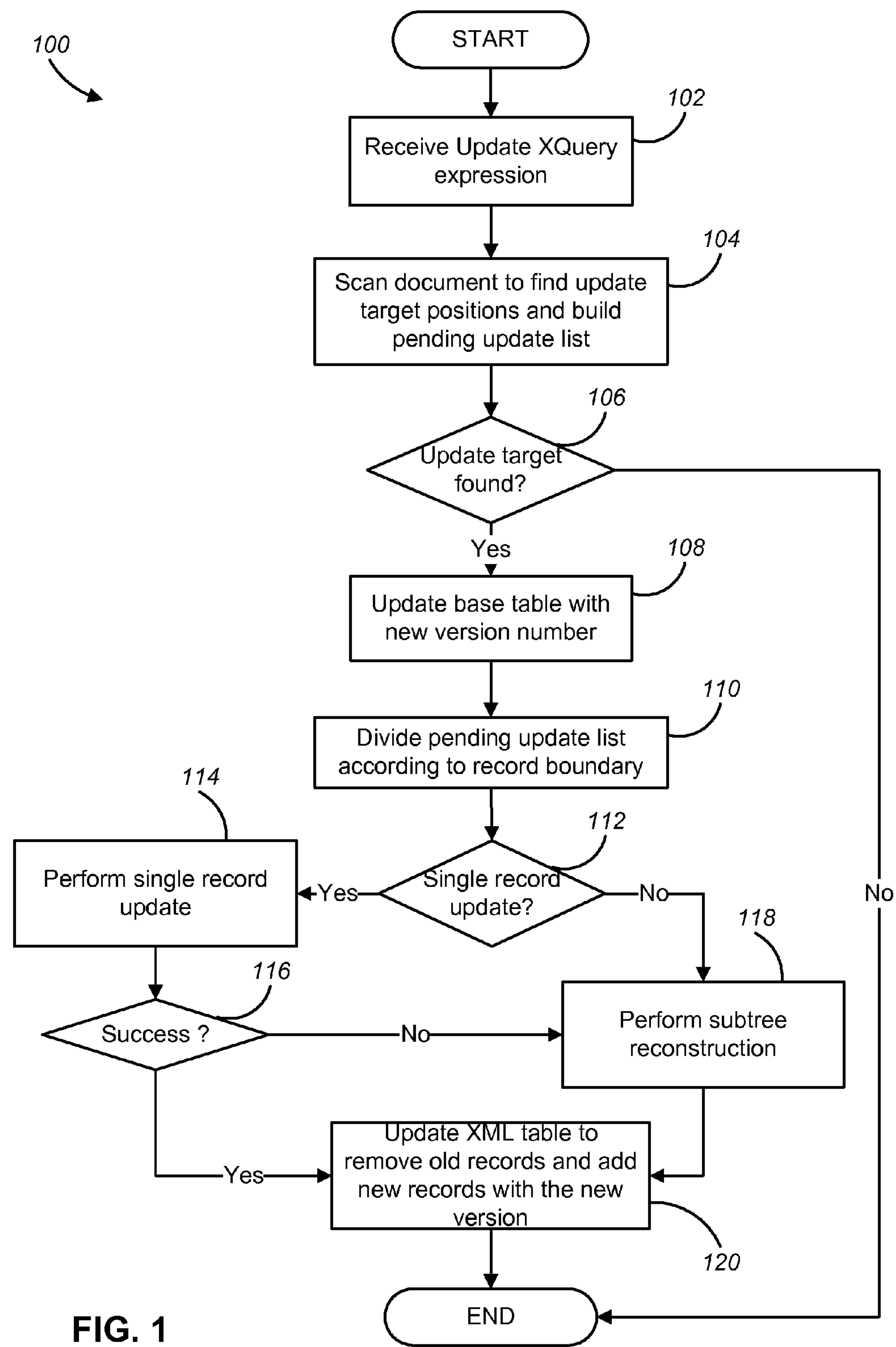
FIG. 1 is a flowchart showing a general overview of a process for performing a partial update of an XML document in accordance with one embodiment.

FIG. 1 is a flowchart showing a general overview of a process (100) for performing a partial update of an XML document in accordance with one embodiment. As can be seen in FIG. 1, the process starts by a computer processor receiving an update XQuery expression (step 102). As is well known to those of ordinary skill in the art, the XQuery programming language is a query and functional programming language that is designed to query collections of XML data. An update XQuery expression, in general terms, allows insertion, deletion, and replacement of XML document nodes, respectively. It should however be realized that the various embodiments described herein are not limited to the XQuery programming language, but other programming languages with the same or similar functionalities can be used for other types of hierarchically stored data.

Based on the update XQuery expression, the processor scans the XML document to find update target positions and to build a pending update list (step 104). The process then checks if an update target has been found (step 106). If no update target is found, the process ends. If an update target is found, the base table row of the XML column is updated with a new document version (step 108). Then, the pending update list is divided according to record boundaries (step 110). For each pending update, it is decided whether to apply a "single record update" or a "subtree reconstruction" approach (step 112). Both of these approaches will be described in further detail below, but in general they both generate new database records and determine which old database records should be replaced. If a single record update is performed (step 114), is evaluated (step 116) and found to be unsuccessful, the process performs a subtree reconstruction (step 118). If the single record update is determined to be successful in step 116, or if a subtree reconstruction has been performed in step 118, the process continues with updating the XML table (step 120) to mark the old records (that is, to perform a logical deletion) and to add new records with the new version, which ends the process (100). In order for these operations to be possible, it is necessary to have an underlying computer system that supports these types of operations. One embodiment of such a system will be described in further detail below.

First, however, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System Features

The techniques in accordance with various embodiments of the invention use a number of features that have been described in previous co-pending U.S. patent applications, including node identifier generation, storage schemes for XML column data, and multi-versioning of XML documents. A brief overview of these techniques will now be presented.

As will be clear from the description below, various embodiments may include generating a new node identifier for a node inserted into an XML tree. The node identifiers can be generated in many ways, including ways that are presented in the co-pending U.S. Patent Application Publication No. 2006/0004858, filed on May 4, 2004, and published on Jan. 5, 2006, for "Self-Adaptive Prefix Encoding for Stable Node Identifiers." This application is incorporated herein by reference.

In accordance with the methods described in that application, a variable-length binary string is used to encode node identifiers in a logical tree of nodes for an XML document object model. A general prefix encoding method is followed in which a node identifier is generated by concatenating encodings (also referred to as "local identifiers") at each level of a logical tree along a path from a root node to a particular node. In other words, a node identifier is always a parent node identifier, which has an appended local identifier of the last node in the path. Children of a parent node are thus assigned a local identifier according to their sequence under that particular parent node, and children of different nodes are assigned local identifiers independently at each level in a logical tree. An optional level number may be assigned to nodes based on their logical level in a tree structure at which a node is situated. A root node of a logical tree is assigned a local identifier of zero and can be ignored in the prefix encoding of all descendants. The last byte of a multi-byte local identifier, also known as a boundary byte, in an encoding of a node identifier has "0" as its least significant bit and "1" as the least significant bit of all other bytes (i.e., the bytes in front of the boundary bite). For example, if the ID of the node is "0380", the "80" is the boundary byte, and its last bit is "0". Byte "03", on the other hand, must have its last bit as "1". Therefore, viewed as an integer, a local identifier or a node identifier is always an even number. The encoding method is self-adaptive; for a wide tree, longer encodings can be used at each level. Unlike fixed-length encoding at each level, a shorter encoding is used at the beginning stages of assigning identifiers, and is extended as new nodes are added or inserted. Arbitrary insertions are supported without change to any existing node identifiers. Furthermore, since any given node identifier is a concatenation of local identifiers of nodes at all levels from a root node along the path to a current node, it is possible to determine a parent node identifier by removing from the end of a current node identifier, one level of a local identifier, by checking for a boundary byte having a least significant bit of zero.

The various embodiments of the invention described herein may use one or more storage schemes for XML column data, including as described in co-pending U.S. Patent Application Publication No. 2007/0043743, filed on Aug. 22, 2005, and published on Feb. 22, 2007, for "Packing Nodes into Records to Store XML XQuery Data Model and Other Hierarchically Structured Data", and in co-pending U.S. Patent Application Publication No. 2007/0043751, also filed on Aug. 22, 2005, and also published on Feb. 22, 2007, for "Scalable Storage Schemes for Native XML Column Data of Relational Tables." Both of these applications are incorporated herein by reference.

In accordance with these storage schemes, the logical node identifiers are used to reference the nodes of hierarchically structured data stored within and across relational data structures, such as records or pages of records. A node identifier index maps each logical node identifier to a record identifier for the record that contains the node. When a sub-tree is stored in a separate record, a proxy node represents the sub-tree in the parent record. The mapping in the node identifier index reflects the storage of the sub-tree nodes in the separate record. This storage scheme supports document order clustering and sub-document update with the record as the unit. Since the references between the records are through logical node identifiers, there is no limitation to the moving of records across pages, as long as the indices are updated or rebuilt to maintain synchronization with the resulting data pages.

Figure 2:
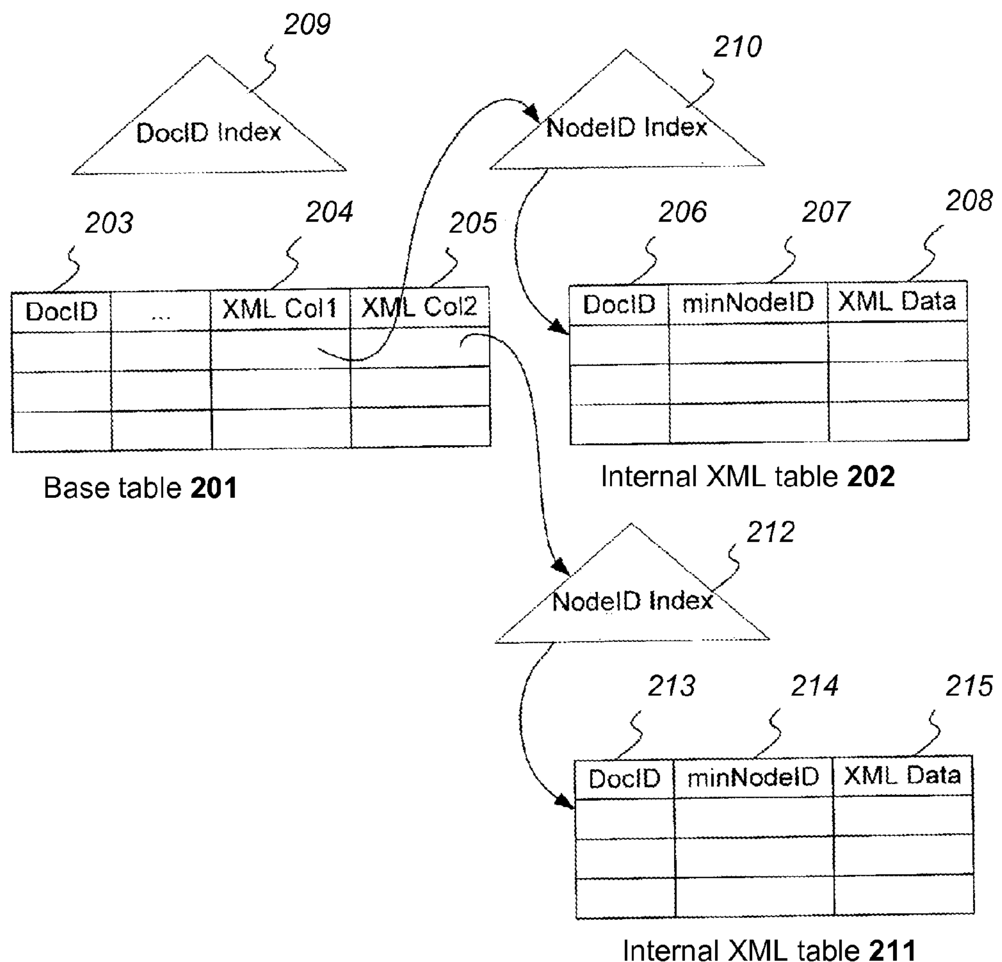
FIG. 2 schematically shows an embodiment of a storage scheme for native XML column data of relational tables in accordance with one embodiment.

FIG. 2 schematically shows an embodiment of a storage scheme for native XML column data of relational tables. For an XML document, a base table (201) is provided, which includes a document identifier (DocID) column (203) and at least one XML column (204-205). The DocID uniquely identifies an XML document. The XML columns (204-205) store information pertaining to the XML data for the XML documents. Here, the DocID column (203) is an identity column shared among all of the XML columns (204-205) of the base table (201). An index on the DocID column (203) provides mapping from a DocID to a base row record identifier (RID). This index is referred to as the DocID index (209). The DocID index (209) provides an efficient method of identifying base table rows for a given DocID as the result of predicates on XML. In this embodiment, the shared DocID column (203) also supports a DocID list ANDing for XML predicates on different XML columns (204-205), given that the base table RID is not stored in the XML value indexes. An XML value index is an index that provides efficient search capability in conjunction with XML predicates in that only qualified DocIDs are returned.

It should be noted that he XML columns (204-205) do not contain the XML data itself. Instead, internal XML tables (202, 211) are provided for storing the nodes for the XML data for the XML columns (204-205) of the base table (201). In this embodiment, one internal XML table (202, 211) is created for each XML column (204-205), respectively. An XML column is represented by an indicator column used to keep a null flag and other state information, such as version number for the XML data if versioning is used, which will be described in further detail below. An internal XML table (202, 211) is a segmented table space, which provides efficient storage management. It stores XML data as a table with a DocID column (206, 213), a minimum NodeID (minNodeID) column (207, 214), and an XML data column (208, 215). The XML data column (208, 215) contains the representations of the nodes of the XML document tree. The DocID and MinNodeID together provide clustering for the rows in the internal XML table (202) to increase search efficiency, and also provide document ordering for the rows.

To link the base table (201) to the XML data in the internal XML tables (202, 211), NodeID Indexes (210, 212) are provided for mapping between the XML columns (204-205) and the XML data (208, 215) in the internal XML tables (202, 211). A NodeID index (210, 212) is created for each internal XML table (202, 211). The NodeID indexes (210, 212) provide mappings between logical node ID's, assigned to each node in the XML document, to a RID of a record in the internal XML table (202, 211) that contains the node. To get to the exact node, traversal of the nodes in the XML data (208, 215) column is performed.

Figure 3:
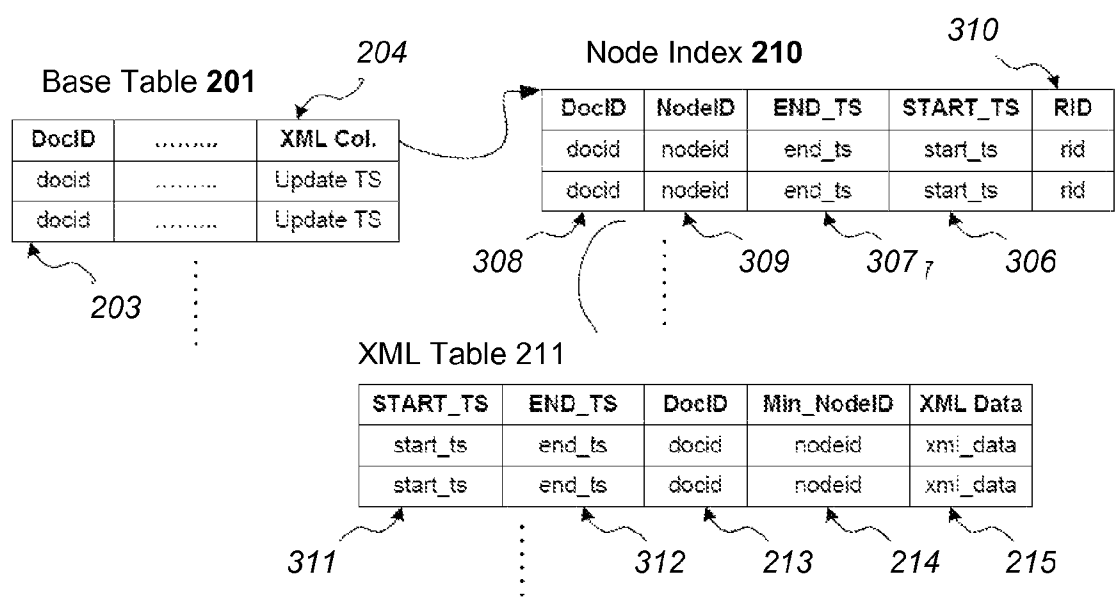
FIG. 3 illustrates an embodiment of the storage structures for hierarchically stored documents in accordance with one embodiment.

Examples of multi-versioning mechanisms, which are also used in accordance with various embodiments of the invention described herein, are set forth in a copending U.S. Patent Application having Ser. No. 12/796,599, filed on Jun. 8 2010, for "Multi-Versioning Mechanism for Updates of Hierarchically Structured Documents Based on Record Storage," which is incorporated herein by reference. FIG. 3 illustrates an embodiment of the storage structures as described in that patent application. In the embodiment illustrated in FIG. 3, each row of the base table (201) contains an XML indicator column (204), which contains update timestamps, and a Doc ID column (203). The update timestamp indicates the time of the last update to the XML document identified by the Doc ID (203). Each entry in the Node ID Index (210) contains a start timestamp (306), an end timestamp (307), a Doc ID (308), a Node ID (309) for an XML record, and a record ID (RID) (310) for the record containing the node identified by the Node ID (309). The start and end timestamps (306-307) indicate the validity time period for the XML record referenced by the index entry. Each row in the XML table (211) contains a start timestamp (311), an end timestamp (312) for XML data (215), a Doc ID (213), and a minimum node ID (214) (that is, the node ID for the root node of the subtree). The start and end timestamps (311-312) indicate the validity time period for the XML record. The Node ID index entries are sorted in descending order of the start and end timestamps (306-307), so that the most current versions of the XML record is listed before the older versions of the XML record. Since the most recent data are typically accessed more frequently, the sorting of the index entries by timestamps avoids significant impact on system performance due to the multi-versioning.

Figure 4:
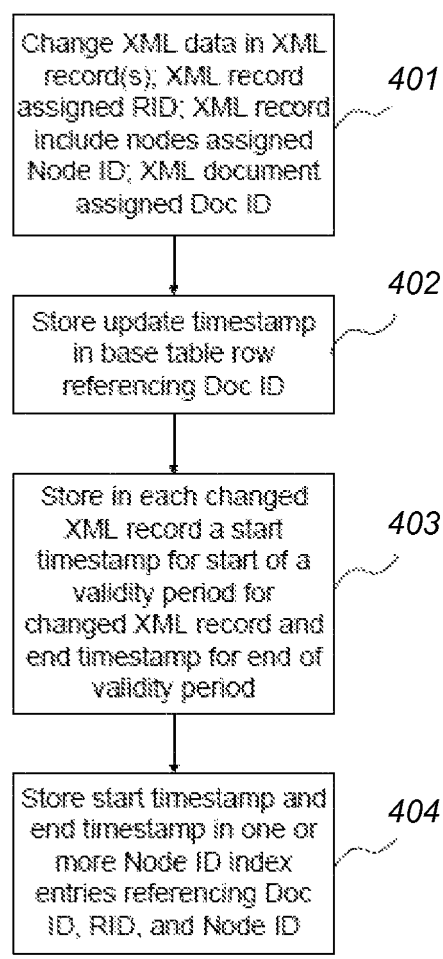
FIG. 4 is a flowchart illustrating a method for multi-versioning data of a hierarchically structured document stored in several data records of a relational database system, in accordance with one embodiment.

FIG. 4 is a flowchart illustrating a method for multi-versioning data of a hierarchically structured document stored in several data records of a relational database system. Referring now to both FIGS. 3 and 4, a change to XML data in one or more XML records of an XML document occurs (step 401). Each changed XML record is assigned a unique record ID (RID). Each record that includes multiple nodes is assigned a Node ID, and the XML document is assigned a unique Doc ID.

An update timestamp (204) is then stored in the in the base table row referencing the Doc ID (step 402). A start timestamp (311) for a start of a validity period for the changed XML record and an end timestamp (312) for the end of the validity period are stored in each changed XML record (step 403). A start timestamp (306) and an end timestamp (307) are stored in one or more Node ID index entries referencing the Doc ID, the RID, and the Node ID (step 404). In this embodiment, more than one Node ID index entry may be generated with the same Doc ID and RID, if another record contains a subtree of a node contained in a record. These Node ID index entries would also have the same timestamps. The timestamps (306-307, 311-312) can be a physical clock timestamp, a log record sequence number, or log relative byte address used to sequence events in a system. The validity period indicated by the start timestamps (306, 311) and end timestamps (307, 312) can then be used to define a version of the XML document identified by the Doc ID, as described in further detail in the above mentioned patent application.

Thus, with the multi-versioning scheme of record storage, it is possible to do partial updates by expiring old records and inserting new records into the XML table (211). The post-update document can subsequently be stitched together from all records with the current version, as indicated by the respective timestamps (306-307, 311-312), including both pre-existing unchanged records and newly updated records. Thus, updates can be done at record level rather than at the document level.

When defining methods for partial updates of XML documents, there are some issues and challenges that must be addressed. Some examples of such issues include:

1) Streaming process of multiple pending updates;
2) Single record update details, including inserting node id, text node merge, and handling of attributes and namespaces;
3) Subtree reconstruction while preserving contexts;
4) Deciding a minimum reconstruction scope;
5) Writing out updated records with new version;
6) Performance enhancements.

Each of these issues will now be discussed in further detail.

1. Streaming Process of Multiple Pending Updates

When the existing XML document is large and updates are required at multiple target positions, the streaming process of the partial update can pipeline the two CPU-costly procedures by scanning the XML document to find the update targets, and performing partial updates. That is, instead of finishing scanning the entire document and collecting all pending update targets before performing the partial updates, the updating can start while the scanning is still going on. For example, after finishing scanning a subtree, it is possible to do a partial update of a subtree, while continuing to scan the document. As a result, the total performance of the updates can be improved. Furthermore, since the scanning process generates pending update targets in document order, it is possible to collect pending updates and then perform a "batch" update on the impacted records at the time when the next pending update target is on a different XML subtree that has a disjoint record hierarchy. Then the previous set of pending updates can be processed before the original XML document is being scanned for the next update target.

2. Single-Record Update

In one embodiment, when the partial update scope is limited to a single record, the XML nodes around the target position in the data record can be adjusted to achieve the update result. In general, every node in the record before the parent of the target node stays untouched. The parent node and the target node are then changed as specified by the update XQuery. Deletion is performed by skipping the target node in the new records. Insertion or replacement is performed by adding the source nodes. After the local adjustments around the target nodes have been completed, the left-over nodes in the record can also be copied exactly as before. Examples of local adjustments include adjusting the length of the parent/ancestor nodes, merging text notes, reordering the attributes and name spaces, etc. An advantage with this approach is that updating the target position is a local operation, and thus much less computationally expensive compared to constructing an entire record node-by-node. However, due to the specific XQuery data model requirements, there are many detailed issues that must be addressed in single-record update.

For example, when inserting new nodes into an existing document, a new node ID must be generated for the newly inserted first child, last child and child between two existing nodes. In embodiments where the node ID follows a self-adaptive prefix encoding scheme, as described above, the new node ID must also adapt to the node IDs in the original document. That is, the old node ID in the original document must be preserved when inserting a new node.

Furthermore, for XML elements, all namespace and attribute nodes are stored before the sub-elements. That is, among the child nodes of an element node, name spaces and attributes should be physically stored as the first few child nodes, followed by the sub elements. Therefore, when namespaces and attributes are inserted, the target position must be adjusted accordingly, so that the order of the child nodes is preserved. For example, when inserting an attribute after a sub-element, the target should be moved to the last existing attribute under the parent element.

Yet another issue is as follows. If after the partial update, two text nodes are adjacent to one another, the two text nodes must be merged into a single text node. This might happen when nodes between two existing text nodes have been deleted, or when a new text node has been inserted next to an existing text node. Such cases must be identified to guarantee that the after-update format keeps characters of designed XML internal formats.

3. Subtree Reconstruction

In one embodiment, if the scope of partial update is detected to be across a record boundary or when a "single update" attempt has failed, a subtree reconstruction is performed, as was discussed above with reference to step 118 of FIG. 1. For instance, the following are some scenarios in which a subtree reconstruction is needed:

When there is insufficient room in the data record after update

When the parent node of an update target is in a different XML record

For text merge, when a sibling text node is in a different XML record

When a inserting a new namespace may impact other child records

A subtree reconstruction starts with a given record and constructs one or more subtrees under this starting point (i.e., the subtree root at the top of the record), while at the same time preserving the context information that connects the newly constructed records with pre-existing records in the XML document. The major challenge of reconstruction is as follows. In the scenario of inserting/replacing, source data specified in the update XQuery should be seamlessly blended into the original document at the target position. Thus, two traversal processes must be enabled at the same time. The first traversal process scans and constructs the original document. When the update target is identified, a second traversal process starts on the source data to continue construction of the document. The switch from the first to the second transversal process is transparent to the constructing service, so that the constructed data is continuous as if it were a single piece of data. When the source data is fully constructed, the control switches back to traversing data located after the target position in the original document, until the whole subtree has been traversed.

Since a subtree is being built (as opposed to a whole document tree), the main difference from the constructor's perspective is that the context information for the subtree must be correctly set up. Such context include: the stack of parent/ancestor records, the parent node, the context node IDs, context path, in-scope namespaces, etc. From the original record header, information can be obtained for most context information and this record header information can be fed into the constructor to build the subtree.

To further improve the performance when the reconstruction scope covers a large subtree, the pending update list pertaining to the subtree can be examined. Based on the target node identifiers, if there are no pending updates that affect a lower level subtree with child records, the reconstruction of the lower level subtree can be avoided. In order to save the reconstruction effort for such records, it is necessary to preserve their context information unchanged. An example of skipping reconstruction is given in the following section with reference to FIG. 7.

4. Determining Reconstruction Scope

Since construction is computationally expensive, it is desirable to minimize the scope of reconstruction to make the reconstruction more efficient. Deciding the minimum starting point of reconstruction depends on whether the update target lands on a single position or on multiple positions in the XML tree structure.

For a single-target update, since the target's parent node must be updated, the update is started from the record containing the parent node. For a multi-target update, the reconstruction can be started from the record containing the top common ancestor of the target parent nodes, while some child records that do not need to be updated can be skipped.

For a non-streaming process, when all pending update targets are available, targets on the common record hierarchy can be grouped for a single reconstruction and "disjoint" target records should be constructed separately. When multiple pending updates are processed in a streaming way, a collection of pending updates are accumulated until the next pending update target lies in a different XML subtree and disjoint record hierarchy. Then the accumulated pending updates are combined for a single reconstruction on the impacted record hierarchy. Another consolidation of a redundant delete operation can be made if one deleted target falls into the subtree of another delete.

Figure 5:
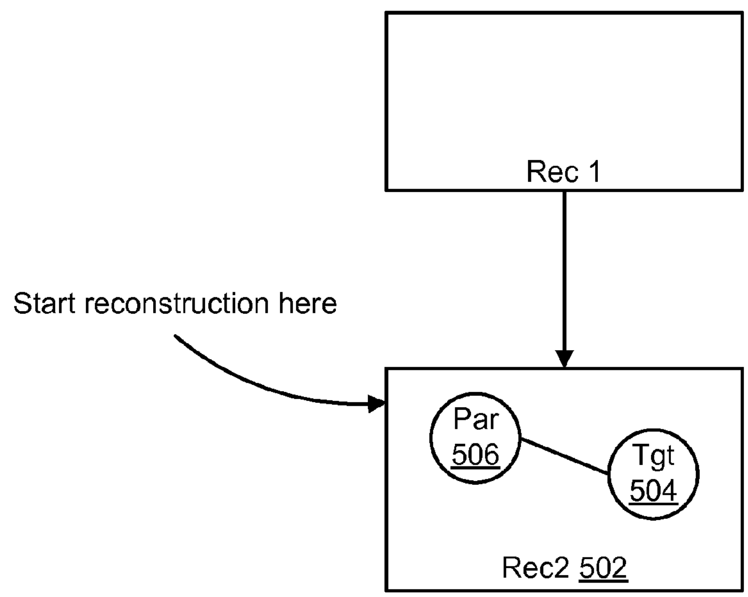
FIG. 5 shows an example of an update of a single record, in accordance with one embodiment.
Figure 5:
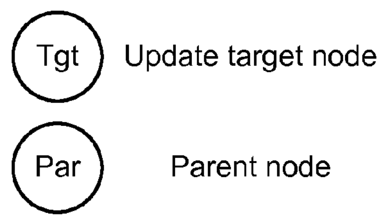
Figure 6:
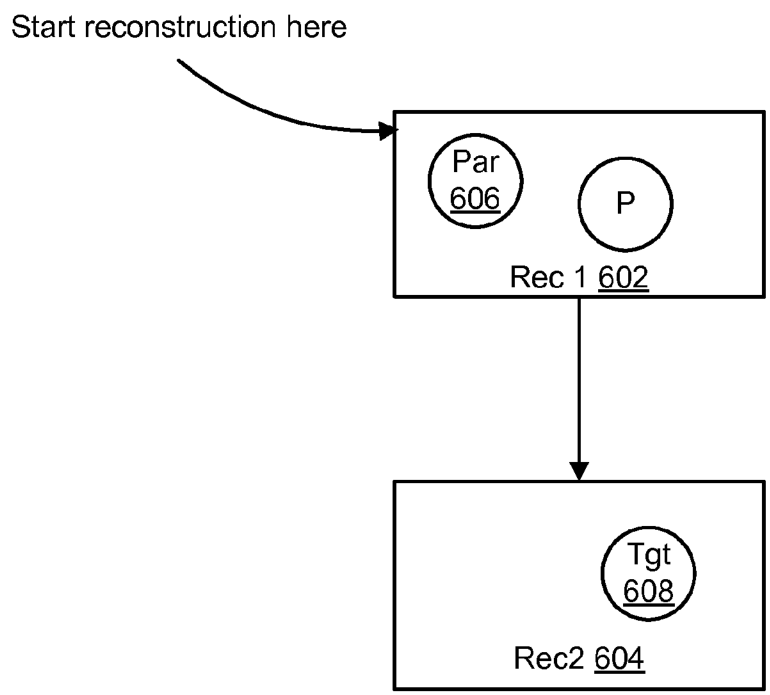
FIG. 6 shows an update of two records, in accordance with one embodiment.
Figure 6:
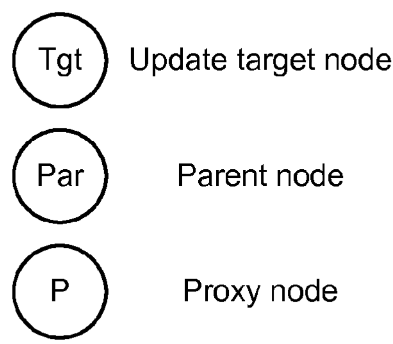
Figure 7:
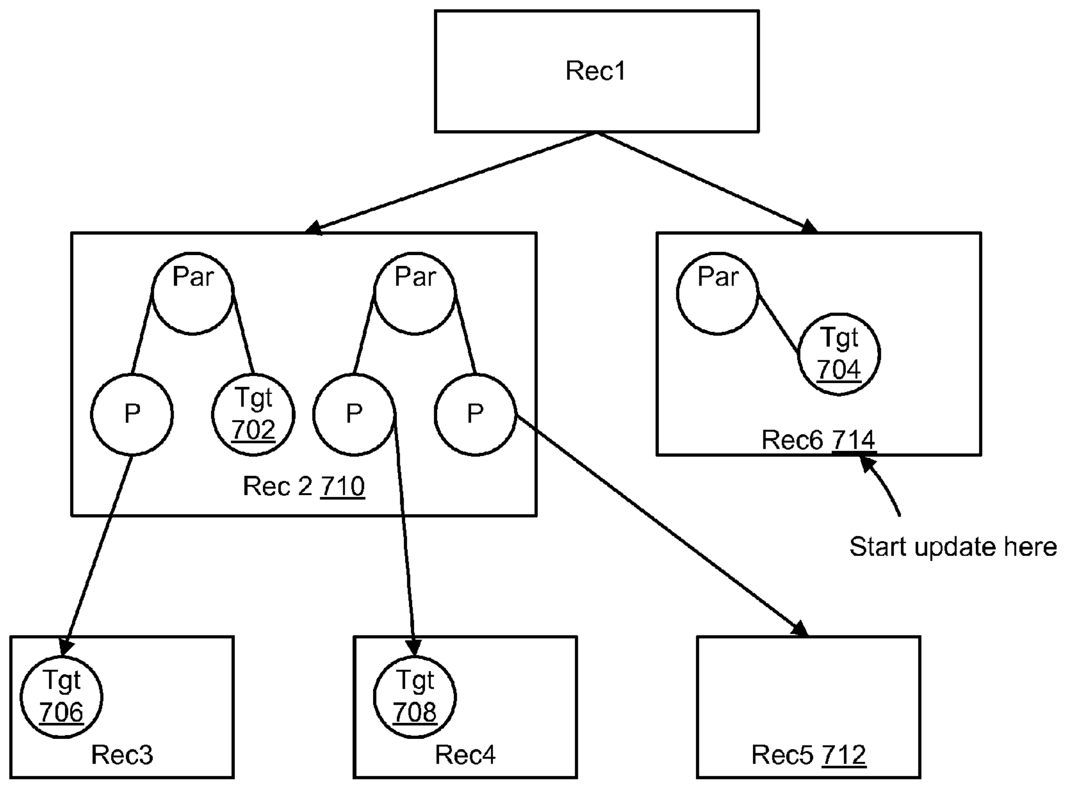
FIG. 7 illustrates an update of four targets, in accordance with one embodiment.

The above principles will now be illustrated by way of three examples, as shown in the drawings and with reference to FIGS. 5-7. FIG. 5 shows an example of an update of a single record, Rec2 (502). As can be seen in FIG. 5, both the target node (504) for the update and its parent node (506) lies in Rec2 (502). Reconstruction is thus started from the top of Rec2 (502).

FIG. 6 shows an update when target and its parent are stored on two records, Rec1 (602) and Rec2 (604), because the parent node (606) and target node (608) are on parent and child records. Reconstruction is then started from the top of Rec1 (602).

FIG. 7 illustrates an update of four targets (702, 704, 706, 708). The first three targets (702, 706, 708) can be combined to start reconstruction at the topmost parent record rec2 (710). However, since rec5 (712) is untouched, rec5 (712) does not need to be reconstructed as long as its context information, e.g., context node ID, context paths and namespaces is preserved while reconstructing rec2 (710). The final target (704) is on rec6 (714), which is disjoint from the record hierarchy under rec2 (710). Therefore rec6 (714) is updated separately.

5. Write Out Updated Records with New Version

As was described above, the final result of a partial update of a hierarchically structured document is to expire the old records (i.e., deleted records) and to add new records (to replace or insert records) into the XML tablespace. A pending delete array, generated from the update process, identifies all subtrees to be deleted by listing their top node ID. Thus, the data records in the XML tablespace are searched to find all records within the subtree and to change their end timestamp to the current time, which causes these records to expire. Next, new records included in a pending insert array are inserted into the XML tablespace with a start timestamp of the new version. As a result, a query for the after-update document will locate the latest version, which contains the new records from the partial update and the unchanged original records from the XML tablespace.

The node ID index entries for the updated records will be regenerated in a corresponding manner to represent the past and new versions. For example, before update, the original document has two records in the XML table with start time t1 and end time 'FFFFFFFF', as illustrated in Table 1 below.

TABLE 1

| Original Document before update | | | | |
|---|---|---|---|---|
| DOCID | MIN_NODEID | START_TIME | END_TIME | XMLDATA |
| 1 | 02 | t1 | FFFFFFFF | Rec1 |
| 1 | 0208 | t1 | FFFFFFFF | Rec2 |

After a partial update, the record Rec2 is changed at time t2. The resulting table is shown below in Table 2, in which the End_Time for the Old Rec2 has been set to t2, and a New Rec2 has been created with Start_Time t2 and End_Time FFFFFFF.

TABLE 2

| Document after update | | | | |
|---|---|---|---|---|
| DOCID | MIN_NODEID | START_TIME | END_TIME | XMLDATA |
| 1 | 02 | t1 | FFFFFFFF | Rec1 |
| 1 | 0208 | t1 | t2 | Old Rec2 |
| 1 | 0208 | t2 | FFFFFFFF | New Rec2 |

In one embodiment, the deletion of old records and insertions of new records do not occur until the final update is complete. In another embodiment, records can be written out after a successful "simple" update of a subtree. In the reconstruction approach, old records can be deleted before the start of reconstruction, and the new records can be inserted as soon as they are produced during reconstruction. This can greatly reduce memory usage, especially when updating a large subtree.

Further Considerations

The mechanisms for partial update described herein are directed to the improvement of the performance when updating an XML document. Thus, it is important to consider the performance in each step of the partial update process. Testing has confirmed that the mechanisms described herein for partial update tend to outperform conventional "whole document" update mechanisms, especially when the document size is large. The computation efficiency and storage usage may be further enhanced by minimizing the number of XML table rows that are deleted and inserted, minimizing the number of times subtree reconstruction is invoked, minimizing the scope of partial update, and writing out modified XML table rows as soon as they are ready.

Currently in DB2 and other systems, when an XML document or hierarchically structured document is updated, the entire old document is typically deleted and a new document is inserted into the database table, even if the update only pertains to a small part of the XML document. One or more embodiments herein provide a more efficient way to update hierarchically structured documents.

Further, the various embodiments can be used to realize one or more of the following advantages. Performing partial updates only for large documents results in both improved update performance and savings in storage. The partial updates allows the user to change an existing document, by inserting, deleting, or replacing parts of the document, as opposed to having to change the entire document. This results in a largely improved user experience. Furthermore, from a performance perspective, a partial update uses multi-versioning to stitch old versions and a new version together, so as to avoid touching unchanged records.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for performing a partial update of a hierarchically structured document referencing one or more records stored in a database, the method comprising:

- receiving an expression by a computer processor, wherein the expression specifies one or more updates to be applied to the document;
- searching the document by the computer processor to find one or more update target positions;
- building, based on the received expression, a pending update list that contains requested updates which have not yet been applied to the document;
- in response to finding an update target position in the document, updating a row of a document column in a base table of the database with the new version number for the document;
- generating, based on the pending update list, new database records to be inserted into the new version of the document and identifying old database records to be replaced in the new version of the document; and
- updating a database table for the document to mark the old database records as obsolete and to add new database records to be referenced in the new version of the document, wherein updating a database table includes:
  - storing an update timestamp in the base table row referencing the document identifier;
  - storing in each changed database record a start timestamp indicating a starting time of a validity period for the changed database record; and
  - storing in each changed database record an end timestamp indicating an ending time of a validity period for the changed database record.

2. The method of claim 1, wherein the hierarchically structured document is an Extended Markup Language Document and the update expression is an expression written in the XQuery programming language.

3. The method of claim 1, wherein generating new database records and identifying old database records includes:

- dividing the pending update list in accordance with record boundaries; and
- determining whether to apply single-record update or subtree reconstruction.

4. The method of claim 1, wherein searching the document and updating the database table are performed as a streaming process.

5. The method of claim 2, wherein each base table row includes: a document identifier column uniquely identifying an Extended Markup Language document, and one or more Extended Markup Language columns storing information pertaining to the Extended Markup Language data for the Extended Markup Language document, wherein each Extended Markup Language column has a corresponding internal Extended Markup Language table storing the Extended Markup Language data.

6. The method of claim 5, wherein the one or more Extended Markup Language columns include an Extended Markup Language indicator column, the Extended Markup Language indicator column containing update timestamps indicating the latest time of update to the document identified by the document identifier column.

7. The method of claim 5, wherein the internal Extended Markup Language table includes: a start timestamp and an end timestamp for the Extended Markup Language data, and a document identifier, wherein the start and end timestamps indicate a validity time period for the Extended Markup Language record.

8. The method of claim 3, further comprising applying a single record update, the single record update including:

adjusting one or more nodes of an Extended Markup Language tree representing the Extended Markup Language document, the one or more nodes being located around an update target node in the Extended Markup Language tree.

9. The method of claim 3, further comprising applying a subtree reconstruction, the subtree reconstruction including:

selecting a record specified by the received expression, the record specifying a starting node in an Extended Markup Language tree representing the Extended Markup Language document; and constructing one or more subtrees under the selected starting node, while also preserving context information that connects newly constructed records with pre-existing records in the Extended Markup Language document.

10. The method of claim 8, further comprising:

preserving a physical storage order of child nodes in response to inserting or replacing one or more of attribute and namespaces for a record.

11. The method of claim 8, wherein adjusting the one or more nodes includes:

determining whether there are any adjacent text nodes in the Extended Markup Language tree; and in response to determining that there are adjacent text nodes, merging at least two of the adjacent text nodes.

12. The method of claim 8, wherein adjusting the one or more nodes includes:

adjusting the update target node and a parent node of the update target node in accordance with the received expression.

13. The method of claim 12, wherein the received expression represents a deletion and wherein the deletion is effected by skipping the update target node in the new records.

14. The method of claim 12, wherein the received expression represents an insertion or replacement and wherein the insertion or replacement is effected by adding new source nodes specified by the received expression into the Extended Markup Language tree.

15. The method of claim 9, wherein constructing one or more subtrees includes:

using a first traversal process to scan and construct the original document;

in response to identifying the update target is identified, using a second traversal process on the source data to continue construction of the document; and in response to determining that the source data is fully constructed, switching back to the first traversal process to traverse data located after the target position in the original document, until the whole subtree has been traversed.

16. The method of claim 9, further comprising:

examining the pending update list pertaining to the subtree; and if there are no pending updates in the pending update list that affect a lower level subtree with child records, avoiding reconstruction of the lower level subtree.

17. The method of claim 9, wherein updating the database table further includes:

collecting pending updates and performing a batch update on the impacted records at the time when the next pending update target is on a different Extended Markup Language subtree having a disjoint record hierarchy.

18. A computer program product for performing a partial update of a hierarchically structured document referencing one or more records stored in a database, the computer program product comprising:

a non-transitory computer readable storage medium having computer readable program code embodied therewith, the computer readable program code comprising:

computer readable program code configured to receive an expression that specifies one or more updates to be applied to the document;

computer readable program code configured to search the document to find one or more update target positions;

computer readable program code configured to build, based on the received expression, a pending update list that contains requested updates which have not yet been applied to the document;

computer readable program code configured to update a row of a document column in a base table of the database with the new version number for the document, in response to finding an update target position in the document;

computer readable program code configured to generate, based on the pending update list, new database records to be inserted into the new version of the document and identify old database records to be replaced in the new version of the document; and computer readable program code configured to update a database table for the document to mark the old database records as obsolete and to add new database records to be referenced in the new version of the document, wherein the computer readable program code configured to update a database table includes:

computer readable program code configured to store an update timestamp in the base table row referencing the document identifier;

computer readable program code configured to store in each changed database record a start timestamp indicating a starting time of a validity period for the changed database record; and computer readable program code configured to store in each changed database record an end timestamp indicating an ending time of a validity period for the changed database record.

19. A system for performing a partial update of a hierarchically structured document referencing one or more records stored in a database, the system comprising:

a database, the database storing a plurality of database records that are referenced by a hierarchically structured document;

a processor; and a memory, the memory storing instructions that when executed by the processor cause the processor to:

receive an expression that specifies one or more updates to be applied to the document;

search the document to find one or more update target positions;

build, based on the received expression, a pending update list that contains requested updates which have not yet been applied to the document;

in response to finding an update target position in the document, update a row of a document column in a base table of the database with the new version number for the document;

generate, based on the pending update list, new database records to be inserted into the new version of the document and identify old database records to be replaced in the new version of the document; and update a database table for the document to mark the old database records as obsolete and to add new database records to be referenced in the new version of the document, wherein the instructions to update a database table include instructions to:

store an update timestamp in the base table row referencing the document identifier;

store in each changed database record a start timestamp indicating a starting time of a validity period for the changed database record; and store in each changed database record an end timestamp indicating an ending time of a validity period for the changed database record.

* * * * *